US008489679B2

(12) United States Patent
Jiang et al.

(10) Patent No.: US 8,489,679 B2
(45) Date of Patent: Jul. 16, 2013

(54) METHOD AND APPARATUS FOR MONITORING NETWORK TRAFFIC AND DETERMINING THE TIMING ASSOCIATED WITH AN APPLICATION

(75) Inventors: Long Jiang, Fremont, CA (US); Charles Tai, San Ramon, CA (US)

(73) Assignee: Fluke Corporation, Everett, WA (US)

( * ) Notice: Subject to any disclaimer, the term of this patent is extended or adjusted under 35 U.S.C. 154(b) by 31 days.

(21) Appl. No.: 13/211,223

(22) Filed: Aug. 16, 2011

(65) Prior Publication Data

US 2013/0046809 A1     Feb. 21, 2013

(51) Int. Cl.
*G06F 15/16*     (2006.01)

(52) U.S. Cl.
USPC ............................ 709/203; 709/224; 726/3

(58) Field of Classification Search
USPC ................... 709/224, 223, 203; 726/3, 22
See application file for complete search history.

(56) References Cited

U.S. PATENT DOCUMENTS

| | | | |
|---|---|---|---|
| 6,981,052 B1 * | 12/2005 | Cheriton | 709/232 |
| 7,009,957 B2 | 3/2006 | Wu et al. | |
| 7,130,289 B2 | 10/2006 | Kuan et al. | |
| 7,236,460 B2 | 6/2007 | Wu et al. | |
| 7,289,465 B2 | 10/2007 | Kuan et al. | |
| 7,292,562 B2 | 11/2007 | Wu et al. | |
| 7,385,948 B2 | 6/2008 | Kuan et al. | |
| 7,539,146 B2 | 5/2009 | Wu et al. | |
| 7,596,109 B1 | 9/2009 | Farrington | |
| 7,616,586 B2 | 11/2009 | Li et al. | |
| 7,702,775 B2 | 4/2010 | Kuan et al. | |
| 7,711,809 B2 | 5/2010 | Kuan et al. | |
| 7,817,581 B2 | 10/2010 | Blackwell et al. | |
| 7,836,166 B2 | 11/2010 | Kuan et al. | |
| 2002/0120727 A1 * | 8/2002 | Curley et al. | 709/223 |
| 2003/0065986 A1 * | 4/2003 | Fraenkel et al. | 714/47 |
| 2005/0144441 A1 * | 6/2005 | Govindarajan | 713/160 |
| 2010/0205292 A1 * | 8/2010 | Diaz | 709/224 |

\* cited by examiner

*Primary Examiner* — El Hadji Sall
(74) *Attorney, Agent, or Firm* — Edwards Wildman Palmer LLP; Scott D. Wofsy; Christopher J. Capelli

(57) ABSTRACT

A method and apparatus is disclosed herein for monitoring network traffic. In one embodiment, the method comprises monitoring, using a monitoring device located near a first end of one segment of a connection with a client and a server in a network, packets that are part of an initial TCP handshake between the client and the server and determining a network time, a server time, and a client time based on information collected when monitoring the one segment.

20 Claims, 8 Drawing Sheets

Server(s) and client(s) classification

| Frame # | 10.0.1.4 | 10.0.1.3 | Delta Time | Rel. Time |
|---|---|---|---|---|
| 1 S | 4983 > http [SYN]Seq=2380252173Win=65535 Len=0 MSS= | | 0.000000 | 0.000000 |
| 4 | http > 4983[SYN,ACK]Seq=4083184377 Ack=2380252174... | | 0.099091 | 0.099091 |
| 5 C | 4983 > http [ACK]Seq=2380252174 Ack=4083184378 Win=6... | | 0.000287 | 0.099378 |
| 6 S | GET /main.asp HTTP/1.1 | | 0.000157 | 0.099535 |
| 10 C | HTTP/1.1 200 OK | | 0.100161 | 0.199696 |
| 11 S | 4983 > http [ACK]Seq=2380252454 Ack=4083184648 Win=6... | | 0.128108 | 0.327804 |
| 19 S | Continuation or non-HTTP traffic Timeout | | 3.860089 | 4.187893 |
| 20 C | Continuation or non-HTTP traffic | | 0.015594 | 4.203487 |
| 21 S | 4983 > http [ACK]Seq=2380252454 Ack=4083184705 Win=6... | | 0.000103 | 4.203590 |
| 27 | Continuation or non-HTTP traffic | | 0.984270 | 5.187860 |
| 28 | http > 4983[FIN,ACK]Seq=4083184761 Ack=2380252454 W... | | 0.000007 | 5.187867 |
| 29 C | 4983 > http [ACK]Seq=2380252454 Ack=4083184762 Win=6... | | 0.000141 | 5.188008 |
| 30 | 4983 > http [FIN,ACK]Seq=2380252454 Ack=4083184762 W... | | 0.000305 | 5.188313 |
| 34 S | 4983 > http [ACK]Seq=4083184762 Ack=2380252455 Win=6... | | 0.099135 | 5.287448 |

FIG. 3A

| Frame # | 10.0.1.4 | 10.0.1.3 | Delta Time | Rel. Time |
|---|---|---|---|---|
| 1 S | 4983 > http [SYN]Seq=2380252173Win=65535 Len=0 MSS= | | 0.000000 | 0.000000 |
| 4 | http > 4983[SYN,ACK]Seq=4083184377 Ack=2380252174 | | 0.099091 | 0.099091 |
| 5 C | 4983 > http [SYN]Seq=2380252173Win=65535 Len=0 MSS= | | 0.000287 | 0.099378 | largest time

FIG. 3B

| Frame # | 10.0.1.4 | 10.0.1.3 | Delta Time | Rel. Time |
|---|---|---|---|---|
| 1 S | 4983 > http [SYN]Seq=2380252173Win=65535 Len=0 MSS= | | 0.000000 | 0.000000 |
| 4 | http > 4983[SYN,ACK]Seq=4083184377 Ack=2380252174... | | 0.099091 | 0.099091 |
| 5 C | 4983 > http [ACK]Seq=2380252174 Ack=4083184378 Win=6... | | 0.000287 | 0.099378 |
| 6 S | GET /main.asp HTTP/1.1 | | 0.000157 | 0.099535 |
| 10 C | HTTP/1.1 200 OK | | 0.100161 | 0.199696 |
| 11 | 4983 > http [ACK]Seq=2380252454 Ack=4083184648 Win=6... | | 0.128108 | 0.327804 |
| 19 S | Continuation or non-HTTP traffic Timeout | | 3.860089 | 4.187893 |
| 20 C | Continuation or non-HTTP traffic | | 0.015594 | 4.203487 |
| 21 | 4983 > http [ACK]Seq=2380252454 Ack=4083184705 Win=6... | | 0.000103 | 4.203590 |
| 27 S | Continuation or non-HTTP traffic | | 0.984270 | 5.187860 |
| 28 | http > 4983[FIN,ACK]Seq=4083184761 Ack=2380252454 W... | | 0.000007 | 5.187867 |
| 29 C | 4983 > http [ACK]Seq=2380252454 Ack=4083184762 Win=6... | | 0.000141 | 5.188008 |
| 30 | 4983 > http [FIN,ACK]Seq=2380252454 Ack=4083184762 W... | | 0.000305 | 5.188313 |
| 34 S | 4983 > http [ACK]Seq=4083184762 Ack=2380252455 Win=6... | | 0.099135 | 5.287448 |

FIG. 3C

| Frame # | 10.0.1.4 | 10.0.1.3 | Delta Time | Rel. Time |
|---|---|---|---|---|
| 2 S | 4983 > http [SYN]Seq=2380252173Win=65535 Len=0 MSS= | | 0.000000 | 0.000000 |
| 3 C | http > 4983[SYN,ACK]Seq=4083184377 Ack=2380252174... | | 0.000065 | 0.000065 |
| 7 C | 4983 > http [ACK]Seq=2380252174 Ack=4083184378 Win=6... | | 0.099535 | 0.099600 |
| 8 S | GET /main.asp HTTP/1.1 | | 0.000028 | 0.099628 |
| 9 C | HTTP/1.1 200 OK | | 0.001036 | 0.100664 |
| 12 | 4983 > http [ACK]Seq=2380252454 Ack=4083184648 Win=6... | | 0.227456 | 0.328120 |
| 17 S | Continuation or non-HTTP traffic Timeout | | 3.760920 | 4.089040 |
| 18 C | Continuation or non-HTTP traffic | | 0.015549 | 4.104589 |
| 22 | 4983 > http [ACK]Seq=2380252454 Ack=4083184705 Win=6... | | 0.099415 | 4.204004 |
| 25 S | Continuation or non-HTTP traffic | | 0.884997 | 5.089001 |
| 26 | http > 4983[FIN,ACK]Seq=4083184761 Ack=2380252454 W... | | 0.000054 | 5.089055 |
| 31 C | 4983 > http [ACK]Seq=2380252454 Ack=4083184762 Win=6... | | 0.099296 | 5.188351 |
| 32 | 4983 > http [FIN,ACK]Seq=2380252454 Ack=4083184762 W... | | 0.000007 | 5.188358 |
| 33 S | 4983 > http [ACK]Seq=4083184762 Ack=2380252455 Win=6... | | 0.000050 | 5.188408 |

FIG. 3D

| Frame # | 10.0.1.4 | 10.0.1.3 | Delta Time | Rel. Time |
|---|---|---|---|---|
| 2 S | 4983 > http [SYN]Seq=2380252173Win=65535 Len=0 MSS= | | 0.000000 | 0.000000 |
| 3 | http > 4983[SYN,ACK]Seq=4083184377 Ack=2380252174... | | 0.000065 | 0.000065 |
| 7 C | 4983 > http [SYN]Seq=2380252173Win=65535 Len=0 MSS= | | 0.099535 | 0.099600 |

FIG. 3E

| Frame # | 10.0.1.4 | 10.0.1.3 | Delta Time | Rel. Time |
|---|---|---|---|---|
| 2 S | 4983 > http [SYN]Seq=2380252173 Win=65535 Len=0 MSS= | | 0.000000 | 0.000000 |
| 3 | http > 4983[SYN,ACK]Seq=4083184377 Ack=2380252174... | | 0.000065 | 0.000065 |
| 7 C | 4983 > http [ACK]Seq=2380252174 Ack=4083184378 Win=6... | | 0.099535 | 0.099600 |
| 8 S | GET /main.asp HTTP/1.1 | | 0.000028 | 0.099628 |
| 9 C | HTTP/1.1 200 OK | | 0.001036 | 0.100664 |
| 12 S | 4983 > http [ACK]Seq=2380252454 Ack=4083184648 Win=6... | | 0.227456 | 0.328120 |
| 17 S | Continuation or non-HTTP traffic Timeout | | 3.760920 | 4.089040 |
| 18 C | Continuation or non-HTTP traffic | | 0.015549 | 4.104589 |
| 22 S | 4983 > http [ACK]Seq=2380252454 Ack=4083184705 Win=6... | | 0.099415 | 4.204004 |
| 25 | Continuation or non-HTTP traffic | | 0.884997 | 5.089001 |
| 26 | http > 4983[FIN,ACK]Seq=4083184761 Ack=2380252454 W... | | 0.000054 | 5.089055 |
| 31 C | 4983 > http [ACK]Seq=2380252454 Ack=4083184762 Win=6... | | 0.099296 | 5.188351 |
| 32 | 4983 > http [FIN,ACK]Seq=2380252454 Ack=4083184762 W... | | 0.000007 | 5.188358 |
| 33 S | 4983 > http [ACK]Seq=4083184762 Ack=2380252455 Win=6... | | 0.000050 | 5.188408 |

METHOD AND APPARATUS FOR MONITORING NETWORK TRAFFIC AND DETERMINING THE TIMING ASSOCIATED WITH AN APPLICATION

FIELD OF THE INVENTION

The present invention relates to the field of monitoring of network traffic; more particularly, the present invention relates to determining the timing, including the network time, server time and client time, associated with an application.

BACKGROUND OF THE INVENTION

Networks can include multiple network devices such as routers, switches, hubs, servers, client computers (e.g., desktop PCs, laptops, workstations), and peripheral devices networked together across a local area network (LAN) and/or a wide area network (WAN). In such networks, data is typically exchanged between a requesting device, such as a client, and a responding device, such as a server. These data exchanges may involve large amounts of traffic.

Today, network technicians may want to analyze network traffic. Because the computer networking environments are very complex and the amount of data exchanged is very large, the network technician may be interested in analyzing only selected traffic between clients and servers, and in particular situations only between specific client/server sets. Such analysis is often done using network monitoring and analyzing devices that are positioned in the network near the client and the server. Using the monitoring device, the network traffic may be observed and a determination may be made as to the client, the server and the protocol, and if the observed traffic is of the desired type and represents client/server traffic within a group of interest to the technician, the traffic or information about the traffic is passed on for further processing or analysis.

Network technicians often want to analyze network traffic to determine where application bottlenecks are occurring. For example, a network technician may want to locate the cause of a slow down in the performance of an application, such as a browser, by monitoring the traffic and determining the time associated with each the client, network and server to complete certain transactions. Such information may enable the technician to isolate where the slow down is occurring and thus be able to take a more informed approach to fixing the problem.

For purposes herein, the network time includes the time necessary to transfer the data through the network between a client and the server, the server time includes the time spent at the server processing a request that was received from the client and generating a response thereto, and the client time includes the time spent by the application at the client generating such requests, processing the results, and waiting to generate a further request. For example, if a person is using a browser and wants to go to a particular website, the browser sends a request to a web server. The web server is going to process that request and send back data to the browser in order to generate a display in the browser. The time necessary to display the page in the browser refers to the client time, while the time spent at the server processing the request is referred to as the server time. If the time between generating requests and subsequently receiving a response and thereafter displaying such a webpage becomes slow, some network technicians will perform a trouble shooting operation to determine where the slow down is occurring in the network. That is, the network technicians would determine whether the server is slow, the network is too congested, or the client is operating too slowly.

Historically, in order to determine the server time, the client time and the network time, two separate sets of monitoring devices were required at both ends of a network segment to monitor the traffic between the client and the server. In other words, a monitoring device was required in proximity to the client on one end of the segment and another monitoring device in proximity to the server was required at the other end of the segment and were used to collect data by which the network technicians could determine where the slow downs were occurring.

It is often very difficult for individual companies wishing to perform such monitoring to have resources at both ends of the segment. It would be beneficial if a company wishing to perform such monitoring were able to determine network time, server time and client time from only one end of the segment.

SUMMARY OF THE INVENTION

A method and apparatus is disclosed herein for monitoring network traffic. In one embodiment, the method comprises monitoring, using a monitoring device located near a first end of one segment of a connection with a client and a server in a network, packets that are part of an initial TCP handshake between the client and the server and determining a network time, a server time, and a client time based on information collected when monitoring the one segment.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIGS. 3A-F are samples of network flow and associated times for a connection when monitoring from the client side and the server side, respectively.

DETAILED DESCRIPTION OF THE PRESENT INVENTION

Figure 1:
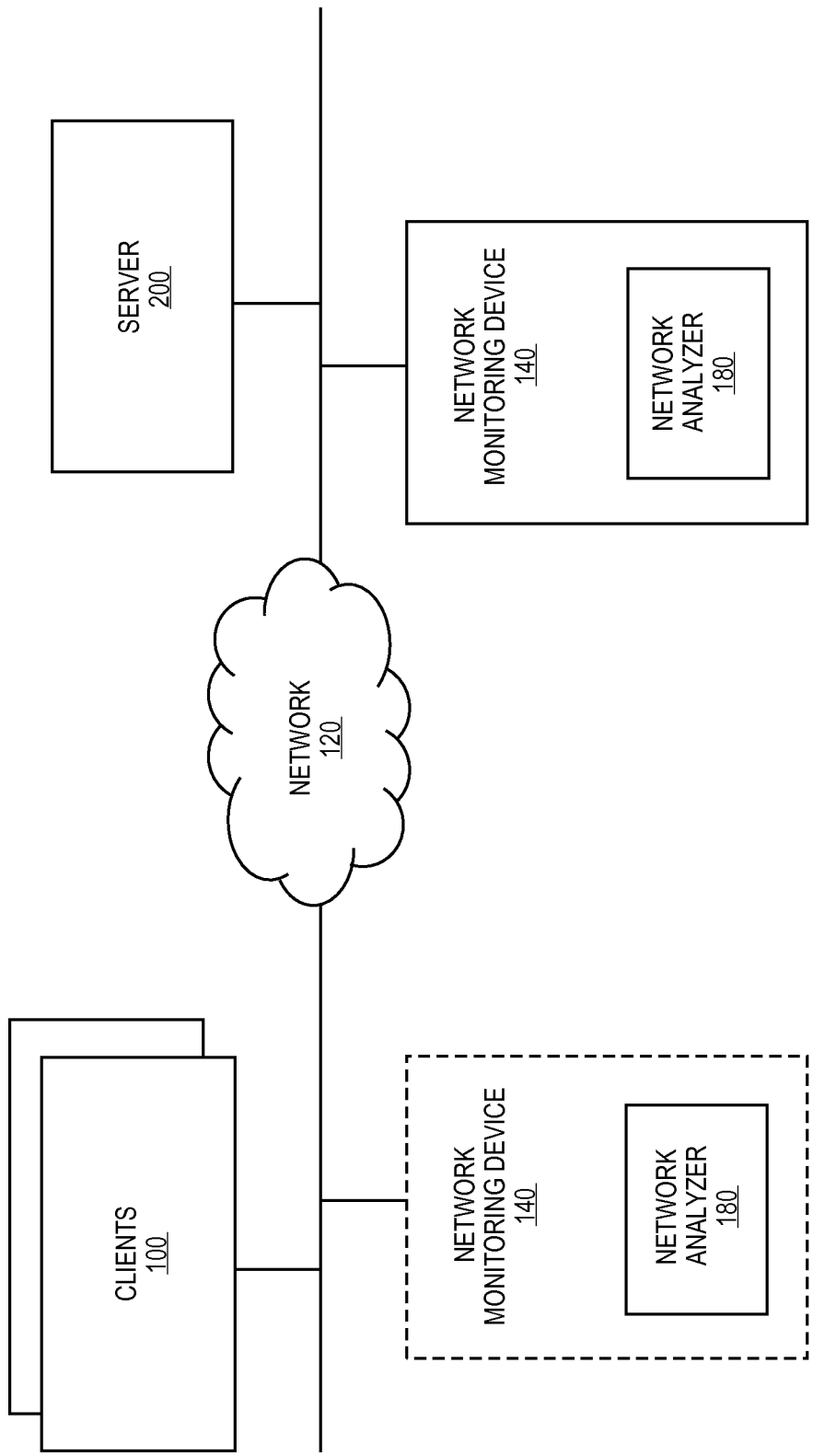
FIG. 1 is a block diagram of one embodiment of a network.

A method and apparatus for monitoring network traffic are disclosed. In one embodiment, by monitoring only a single segment's network traffic, the method identifies an amount of time spent that is associated with each of the three parts of a Transmission Control Protocol (TCP) conversation, i.e., the client, the server and the network, during execution of an application. This provides an indication as to where that application is spending its time and facilitates detecting when one or more of those three part is taking too long and causing a bottleneck. In the prior art, if a server is taking too long to process a request, then the only way to obtain accurate network delay times required monitoring traffic from multiple segments. This was both inconvenient and required a lot of resources. Embodiments of the present invention overcome this problem by only having to monitor one segment (i.e., a physical connection at which traffic is being monitored).

In one embodiment, the techniques described herein monitor an initial Transmission Control Protocol (TCP) handshake. By monitoring the initial TCP handshake, the network delay for the life of the conversation between a client and a server can be identified. Thereafter, all the traffic for that connection coming from the side that we think includes the most network delay is examined and the network delay is subtracted therefrom. The result indicates the time that was spent at the other side (e.g., server processing time). In one embodiment, the formula used to determine the client time, server time and network depend on which side of the traffic is being monitored. When traffic is being monitored from the client side, the formula is as follows:

ClientTime=TotalTime−(NetworkTime+ServerTime).

When the traffic is being monitored from the server side, the formula is as follows:

ServerTime=TotalTime−(NetworkTime+ClientTime).

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

FIG. 1 is a block diagram of one embodiment of a network. Referring to FIG. 1, a network may comprise multiple network devices 100 which include clients and servers that communicate over a network 120 by sending and receiving network traffic. The traffic is sent as packets according to one or more protocols using one or more packet formats.

A network monitoring device 140 is also connected to the network to monitor traffic being sent on the network. Network monitoring device 140 may also perform analysis on the data collected using an analysis engine and a data memory. In one embodiment, network monitoring device 140 comprises hardware and software, CPU, memory, and interfaces to connect to and monitor traffic on the network, as well as performing various testing and measurement operations, transmitting and receiving data, etc. In one embodiment, network monitoring device 140 operates as part of a computer or workstation interfaced with the network.

In one embodiment, packets are monitored as they are being transferred and internally network monitoring device 140 attempts to identify the flow that each packet is part of and determine the client time, network time and server time associated with the network traffic for each application and client/server pair exchanging traffic for the application. By performing such monitoring, monitoring device 140, including network analyzer 180, can determine where potential bottlenecks exist within the network with respect to the application. This will enable network technicians to more easily address those bottlenecks.

An Example Process Flow

Figure 2A:
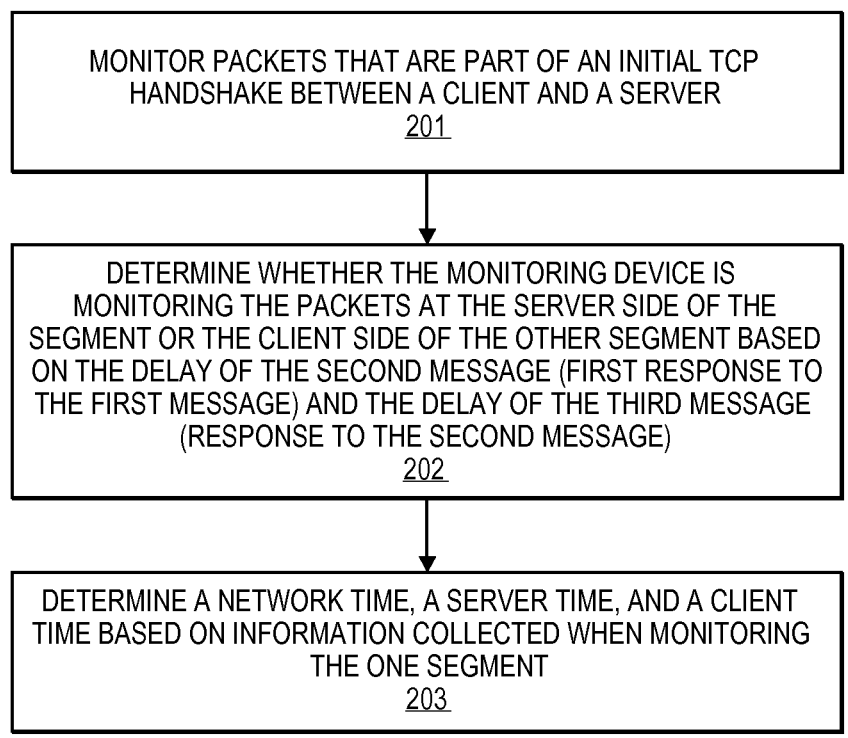
FIG. 2A is a flow diagram of a process for monitoring network traffic of an application and determining the client time, network time, and server time associated with the application.

FIG. 2A is a flow diagram of a process for monitoring network traffic of an application and determining the client time, network time, and server time associated with the application. The process is performed by processing logic which may comprise hardware (e.g., circuitry, dedicated logic, etc.), software (such as is run on a general purpose computer system or a dedicated machine), or a combination of both. In one embodiment, the process is performed by a network monitoring device such as described herein.

Referring to FIG. 2A, the process begins by monitoring packets that are part of an initial TCP handshake between a client and a server (processing block 201). The packets are monitored using a monitoring device located at one of the segments of a connection between the client and the server in a network.

In one embodiment, processing logic determines whether the monitoring device is monitoring the packets at the server side of one segment or the client side of the other segment based on the delay of the second message (first response to the first message) and the delay of the third message (response to the second message) (processing block 202). If the delay in the first response is large in comparison to the second response, the monitoring device is monitoring from the client side.

Based on where the monitoring device is monitoring packets, processing logic determines a network time, a server time, and a client time based on information collected from monitoring the one segment (processing block 203). In one embodiment, the network time is a total time that the connection uses due to network delays and one or more retries, if any, the client time is time spent at the client including client idle time and client response delays, and the server time is time spent at the server, including server idle time and server response delays. Also in one embodiment, the network delay is assumed to be the same for the entire time of the connection; thus, it only needs to be determined once.

Figure 2B:
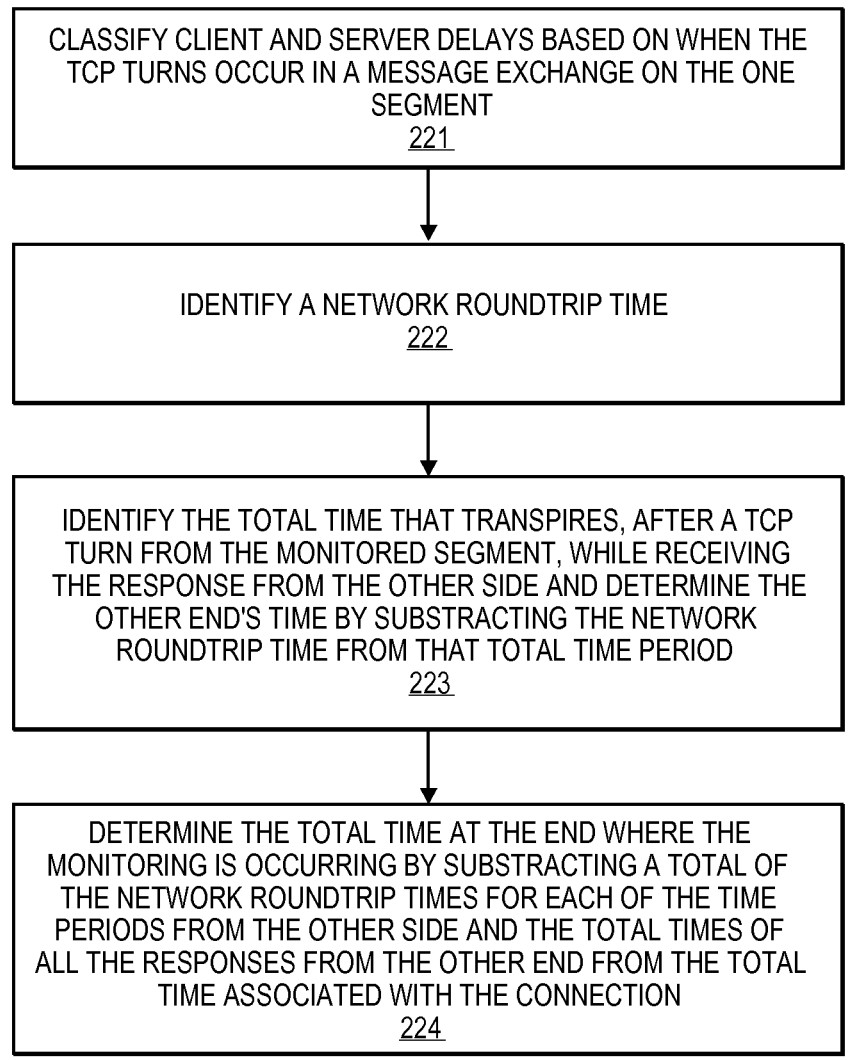
FIG. 2B is a flow diagram of one embodiment of a process for determining the client time, network time, and server time.

FIG. 2B is a flow diagram of one embodiment of a process for determining the client time, network time, and server time. The process is performed by processing logic which may comprise hardware (e.g., circuitry, dedicated logic, etc.), software (such as is run on a general purpose computer system or a dedicated machine), or a combination of both. In one embodiment, the process is performed by a network monitoring device such as described herein.

Referring to FIG. 2B, the process begins by processing logic classifying client and server delays based on when the TCP turns occur in a message exchange on the one segment (processing block 221). In one embodiment, each TCP turn is defined as the time when the flow of packets change directions from either the client side or the server side.

Next, processing logic identifies a network roundtrip time (processing block 222). In one embodiment, this is done based solely on which of the two responses are larger. In one embodiment, processing logic identifies the roundtrip time as the larger of the two response messages after the very first message was detected (message 2 or message 3).

Once the roundtrip time has been determined, processing logic identifies the total time that transpires after a TCP turn from the monitored segment, while receiving the response from the other side and determines the other end's time by subtracting the network roundtrip time from that total time period (processing block 223).

In one embodiment, for at least one TCP turn, if monitoring from the client side and a delta time is greater than or equal to the roundtrip time, then the roundtrip time is used as the network time and it is subtracted from the delta time to determine the server time. In one embodiment, for at least one TCP turn, if monitoring from the client side, the time of the other end is used as the server time if the other end's time is less than a predetermined percentage (e.g., 90%) of the roundtrip time or if a previous delta time was already found to contain a round trip time within this same turn. However, other percentages may be used.

Once the other end's time has been determined for each of the time periods from the other side, processing logic determines the total time associated with the end where the monitoring is occurring by subtracting a total of the network roundtrip times for all of the preceding TCP turns of concern and a total of all the response times of the other end for all the TCP turns of concern from the total time associated with the connection (processing block 224).

Examples of Client/Server/Network Time Analysis from Single Segment

In one embodiment, the techniques described here produce 4 parameters in judging application/network performance as monitored from a single segment.

In one embodiment, certain assumptions about the traffic conditions are made. First, the network delay at the point of being monitored is minor (negligible) compared to the other end. Second, retry times are always interpreted as network time, since we cannot determine why. Third, network delay does not change for the life of the connection. Fourth, the individual leg of the network delay is not important because only the total delay from the other side is examined. Fifth, TCP kernel response times are negligible. Note that no accounting is made for the difference in transit time due to packet size differences.

For purposes herein, the following definitions are used:
Transaction Time—total time for the connection.
Network Time—total time the connection was due to network delays and retries.
Client Time—total time was spent at the client side, includes client idle and client response delays.
Server Time—total time was spent at the server side, includes server idle and server response delays.

FIGS. 3A-C and 3D-F are two samples of network flow and associated times for a connection when monitoring from the client side and the server side, respectively.

Analyzing From the Client Side Traffic Only

FIGS. 3A-3C illustrate an example of traffic between a client and a server where the monitoring device is on the client side.

Step #1) Classify Client/Server Packets Based on Turns.
FIG. 3A shows the resulting classification of client and server packets.

Step #2) Identify the Network Round Trip Time.
The monitoring device uses the TCP handshake packets to identify the network round trip time (RTT). In one embodiment, the larger of the 2 response times for the two response message (after the very first message was detected) is identified as the RTT. For example, in FIG. 3A, in comparing Frame #4 to Frame #5, 0.099091 is larger than 0.000287.

FIG. 3B highlights the largest time in the TCP handshake. Thus, in this case RTT is 0.099091.

From the delay from the server, the monitoring device determines packets are being captured from the client side. In FIG. 3A, since the response from the server (frame #4) is taking longer than the response from the client (frame #5), it is determined that the monitoring is ocurring on the client side.

Step #3) Identify the Other End's (i.e., the Server's Time) Total Time.

Since monitoring is occurring on the client side, the packet processing is based on the server times. Therefore, these are the times that will be examined and only these will be examined. FIG. 3C illustrates all the server times (which are boxed in the figure). These times are the only packets being received from the other end.

Step #4) Subtract the RTT to Get the Other End's Time (i.e., the Server's Time).

In one embodiment, if the other end's delta time is greater than or equal to the RTT, then the monitoring device uses the RTT as the network delay and subtracts the RTT from the other end's time to add to the ServerTime. In one embodiment, if the other end's delta time is less than a predetermined percentage (e.g., 90%) of the RTT, then the monitoring device uses the other end's delta time to add to the ServerTime. In one embodiment, if the other end's delta time is less than the RTT and within a predetermined percentage (e.g., 90%) of the RTT, the monitoring device uses the other end's delta time to add to the NetworkTime. In one embodiment, if there are multiple entries corresponding to multiple responses within the same TCP turn, the monitoring device uses the first entry with a delta time greater than a predetermined percentage (e.g., 90%) of the RTT and subtracts the RTT from the other end's delta time, and all other entries within that TCP turn needs to be added to the ServerTime.

TABLE 1

|  | NetworkTime | ServerTime |
|---|---|---|
| 0.099091 | 0.099091 | 0 |
| 0.100161 | 0.099091 | 0.00107 |
| 3.860089 | 0.099091 | 3.760998 |
| 0.015594 |  | 0.015594 |
| 0.984270 | 0.099091 | 0.885179 |
| 0.000007 |  | 0.000007 |
| 0.099135 | 0.099091 | 0.000044 |
| Total | 0.495455 | 4.662892 |

From Table 1 above, the network time and the server time is as follows:

NetworkTime=0.495455

ServerTime=4.662892

Step #5) Calculate this End's Time (i.e., the Time at the End where Monitoring is being Performed).

The calculation of this end's time is based on the total time of the connection, the total of all the network times that occurred during the connection and the total of all the server times that occurred during the connection.

Thus, in this case, the monitoring device uses the following formula:

ClientTime=TotalTime−(NetworkTime+ServerTime)

ClientTime=5.287448−(0.495455+4.662892)

ClientTime=0.129448

Analyzing From the Server Side Traffic Only

FIGS. 3D-3F illustrate an example of traffic between a client and a server where the monitoring device is on the server side.

Step #1) Classify Client/Server Packets Based on Turns.

FIG. 3D shows the resulting classification of client and server packets.

Step #2) Identify the Network Round Trip Time.

The monitoring device uses the TCP handshake packets to identify the network round trip time (RTT). In one embodiment, the larger of the 2 times associated with the two response messages is identified as the RTT. For example, in FIG. 3D, when comparing the time for Frame #3 to that of Frame #7, 0.099535 is larger than 0.000065.

FIG. 3E highlights the largest time in the TCP handshake. Thus, in this case RTT is 0.099535.

From the delay of the client's response, the monitoring device determines packets are being captured from the server side.

Step #3) Identify the Other End's Total Time (i.e., the Client's Time).

Since monitoring is occurring on the server side, the packet processing is based on the client times. Therefore, these are the times that will be examined and only these will be examined. FIG. 3F illustrates all the client times (which are boxed in the figure). These times are the only packets being received from the other end.

Step #4) Subtract RTT to Get the Other End's Time (i.e., the Client's Time).

In one embodiment, if the other end's (the client's time) delta time is greater than or equal to the RTT, then the monitoring device uses the RTT as the network delay and subtracts the RTT from the other end's delta time to be added to the ClientTime. In one embodiment, if the other end's delta time is less than a predetermined percentage (e.g., 90%) of the RTT, then the monitoring device uses the other end's delta time to add to the ServerTime. In one embodiment, if the other end's delta time is less than the RTT and within a predetermined percentage (e.g., 90%) of the RTT, the monitoring device uses the other end's delta time to be added to the NetworkTime. In one embodiment, if there are multiple entries corresponding to multiple responses within the same TCP turn, the monitoring device uses the first entry with a delta time greater than the predetermined percentage of the RTT and subtracts the RTT from the other end's delta time, and all other entries within that TCP turn needs to be added to the ClientTime.

TABLE 2

|  | NetworkTime | ClientTime |
|---|---|---|
| 0.099535 | 0.099535 | 0 |
| 0.000028 |  | 0.000028 |
| 0.227456 | 0.099535 | 0.127921 |
| 0.099415 | 0.099415 | 0 |
| 0.099296 | 0.099296 | 0 |
| 0.000007 |  | 0.000007 |
| Total | 0.397781 | 0.127956 |

From Table 2 above, the network time and the client time is as follows:

NetworkTime=0.397781

ClientTime=0.127956

Step #5—Calculate this End's Time.

The calculation of this end's time is based on the total time of the connection, the total of all the network times that occurred during the connection and the total of all the client times that occurred during the connection.

Thus, in this case, the monitoring device uses the following formula:

ServerTime=TotalTime−(NetworkTime+ClientTime)

ServerTime=5.188408−(0.397781+0.127956)

ServerTime=4.662671

An Example of a Monitoring/Analysis Device

Figure 4:
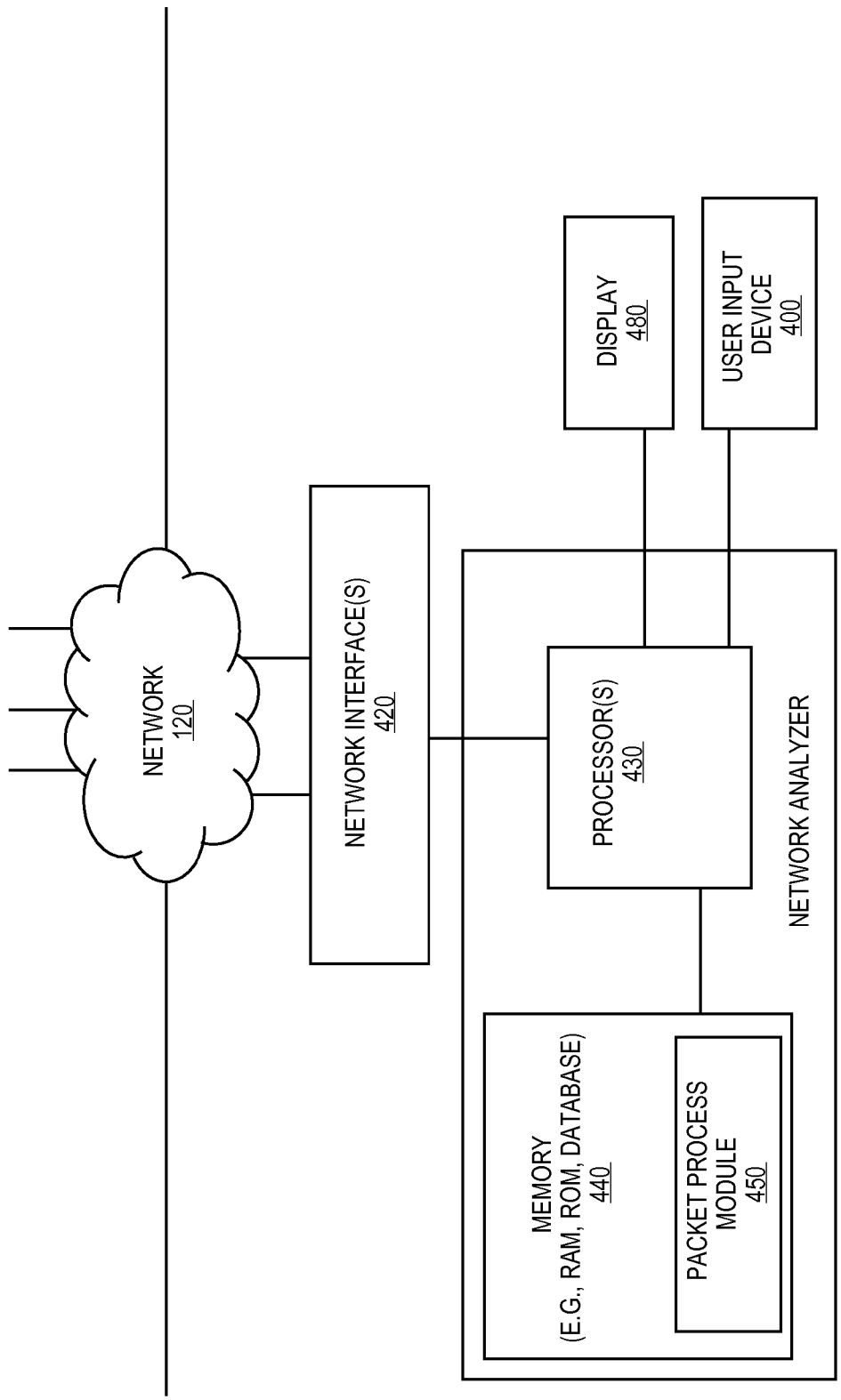
FIG. 4 illustrates one embodiment of a block diagram of a network monitoring device.

FIG. 4 is one embodiment of a block diagram of a network monitoring device. Referring to FIG. 4, the network monitoring device may include network interfaces 420 that attach the device to a network via multiple ports, one or more processors 430 for performing monitoring and analysis described above, memory (e.g., RAM, ROM, databases, etc.) 424, display 428, user input devices 430 (e.g., keyboard, mouse or other pointing devices, touch screen, etc.). Packet processing module 425 is stored in memory 424 and may be executed by processors 423 to provide processing of packets and storage of data related thereto for use in the monitoring device to assist in packet processing and analysis related to client/server traffic.

In one embodiment, the monitoring device is attached to the network and observes transmissions on the network to collect information and statistics thereon related to client/server traffic. The network monitoring device uses a set of filters that operate based on detecting TCP traffic only in order to collect only information that is relevant to client/server traffic. Such IP address ranges or ports may be set by the network monitoring device using a user interface.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention. The process is performed by processing logic that may comprise hardware (circuitry, dedicated logic, etc.), software (such as is run on a general purpose computer system or a dedicated machine), or a combination of both.

We claim:

1. A method comprising:
    monitoring, using a monitoring device located near a first end of one segment of a connection between a client and a server in a network, at least packets of an initial transmission control protocol handshake between the client and the server; and
    determining by the monitoring device a network time, a server time, and a client time based on information collected when monitoring the one segment, wherein the determining comprises at least:
    classifying client and server packets based on one or more transmission control protocol turns in a message exchange on the one segment, wherein each of the one or more transmission control protocol turns comprises at least one request message and at least one response message to the at least one request message;
    identifying a network roundtrip time based on the classifying the client and server packets;
    identifying a first time period corresponding to a total time that transpires after each transmission control protocol turn from the one segment, and
    determining a second end time period for a second end of a further segment of the connection between the client and the server, the further segment not comprising the monitoring device, by subtracting the network roundtrip time from the first time period; and
    determining a first end time period by subtracting a total of the network roundtrip times for all of the one or more transmission control protocol turns and a total of the times of the second end for all of the one or more transmission control protocol turns from a total time associated with the message exchange.

2. The method defined in claim 1, wherein the network time is a total time that the connection uses due to network delays and one or more retries, if any, the client time is time spent at the client including client idle time and client response delays, and the server time is time spent at the server, including server idle time and server response delays.

3. The method defined in claim 1, further comprising determining an average network delay for a session based on information received from monitoring the packets of the initial transmission control protocol handshake.

4. The method defined in claim 1, wherein if the first end comprises a client side of the one segment and the second end comprises a server side of the further segment, then the first end time period and the second end time period comprise the client time and the server time respectively, and further wherein if the first end comprises a server side of the one segment and the second end comprises a client side of the further segment, then the first end time period and the second end time period comprise the server time and the client time respectively.

5. The method defined in claim 1, wherein the determining of the network time, the server time and the client time further comprises determining whether the monitoring device is monitoring of the packets at a server side of the one segment or a client side of the one segment based on a delay between sending the first message from the first end of the segment and subsequently receiving the second message from the second end of the further segment opposite to the first end.

6. The method defined in claim 1 wherein identifying the roundtrip time as the larger of the roundtrip time for two response messages during the initial transmission control protocol handshake.

7. The method defined in claim 1, further comprising using the roundtrip time as the network time and subtracting the roundtrip time from a delta time of the response packet if a time is greater than or equal to the roundtrip time.

8. A computer program product comprising one or more non-transitory computer readable storage media storing a computer program code, the computer program code comprising:
    code for monitoring, using a monitoring device located near a first end of one segment of a connection between a client and a server in a network, at least packets of an initial transmission control protocol handshake between the client and the server; and
    code for determining by the monitoring device a network time, a server time, and a client time based on information collected when monitoring the one segment, wherein the determining comprises at least:
    code for classifying client and server packets based on one or more transmission control protocol turns in a message exchange on the one segment, wherein each of the one or more transmission control protocol turns comprises at least one request message and at least one response message to the at least one request message;
    code for identifying a network roundtrip time based on the classifying the client and server packets;
    code for identifying a first time period corresponding to a total time that transpires after each transmission control protocol turn from the one segment, and
    code for determining a second end time period for a second end of a further segment of the connection between the client and the server, the further segment not comprising the monitoring device, by subtracting the network roundtrip time from the first time period; and
    code for determining a first end time period by subtracting a total of the network roundtrip times for all of the one or more transmission control protocol turns and a total of the times of the second end for all of the one or more transmission control protocol turns from a total time associated with the message exchange.

9. The computer program product of claim 8, wherein the network time is a total time that the connection uses due to network delays and one or more retries, if any, the client time is time spent at the client including client idle time and client response delays, and the server time is time spent at the server, including server idle time and server response delays.

10. The computer program product of claim 8, wherein the method further comprises determining an average network delay for a session based on information received from monitoring the packets of the initial transmission control protocol handshake.

11. The computer program product of claim 8, wherein if the first end comprises a client side of the one segment and the second end comprises a server side of the further segment, then the first end time period and the second end time period comprise the client time and the server time respectively, and further wherein if the first end comprises a server side of the one segment and the second end comprises a client side of the further segment, then the first end time period and the second end time period comprise the server time and the client time respectively.

12. The computer program product of claim 8, wherein the computer program code further comprises code for determining whether the monitoring device is monitoring of the packets at a server side of the one segment or a client side of the one segment based on a delay between sending the first message from the first end of the segment and subsequently receiving the second message from the second end of the further segment opposite to the first end.

13. A monitoring device for use in a network having a client and a server communicating with each other over a connection, the monitoring device located near a first end of one segment of the connection, the monitoring device comprising:
- a network interface configured to couple to the network;
- a memory; and
- an analyzer coupled to the network interface and the memory to monitor packets that are part of an initial transmission control protocol handshake between the client and the server and determine a network time, a server time, and a client time based on information collected when monitoring the one segment,
- wherein determining a network comprises:
- classifying client and server packets based on one or more transmission control protocol turns in a message exchange on the one segment, wherein each of the one or more transmission control protocol turns comprises at least one request message and at least one response message to the at least one request message;
- identifying a network roundtrip time based on the classifying the client and server packets;
- identifying a first time period corresponding to a total time that transpires after each transmission control protocol turn from the one segment, and
- determining a second end time period for a second end of a further segment of the connection between the client and the server, the further segment not comprising the monitoring device, by subtracting the network roundtrip time from the first time period; and
- determining a first end time period by subtracting a total of the network roundtrip times for all of the one or more transmission control protocol turns and a total of the times of the second end for all of the one or more transmission control protocol turns from a total time associated with the message exchange.

14. The device defined in claim 13, wherein the network time is a total time that the connection uses due to network delays and one or more retries, if any, the client time is time spent at the client including client idle time and client response delays, and the server time is time spent at the server, including server idle time and server response delays.

15. The device defined in claim 13, wherein the analyzer is operable to determine a network delay for a session based on information received from monitoring the packets of the initial transmission control protocol handshake.

16. The device defined in claim 13, wherein if the first end comprises a client side of the one segment and the second end comprises a server side of the further segment, then the first end time period and the second end time period comprise the client time and the server time respectively, and further wherein if the first end comprises a server side of the one segment and the second end comprises a client side of the further segment, then the first end time period and the second end time period comprise the server time and the client time respectively.

17. An apparatus comprising:
- a processing system comprising at least one processor and a memory storing a set of computer instructions, the apparatus is located near a first end of one segment of a connection between a client and a server in a network, in which the processing system is arranged to cause the apparatus to:
- monitor at least packets of an initial transmission control protocol handshake between the client and the server; and
- determine a network time, a server time, and a client time based on information collected when monitoring the one segment, wherein the determining of the network time, the server time, and the client time is performed by the processing system arranged to cause the apparatus to:
- classify client and server packets based on one or more transmission control protocol turns in a message exchange on the one segment, wherein each of the one or more transmission control protocol turns comprises at least one request message and at least one response message to the at least one request message;
- identify a network roundtrip time based on the classifying the client and server packets;
- identify a first time period corresponding to a total time that transpires after each transmission control protocol turn from the one segment, and
- determine a second end time period for a second end of a further segment of the connection between the client and the server, the further segment not comprising the monitoring device, by subtracting the network roundtrip time from the first time period; and
- determine a first end time period by subtracting a total of the network roundtrip times for all of the one or more transmission control protocol turns and a total of the times of the second end for all of the one or more transmission control protocol turns from a total time associated with the message exchange.

18. The apparatus of claim 17, wherein the processing system is arranged to cause the apparatus to determine the network time, the server time, and the client time by finding out whether the monitoring device is located on a client side or on a server side.

19. The method of claim 1, wherein the determining the network time, the server time, and the client time comprises at least finding out by the monitoring device whether the monitoring device is located on a client side or on a server side.

20. The computer program product of claim 8, wherein determining the network time, the server time, and the client time comprises at least finding out by the monitoring device whether the monitoring device is located on a client side or on a server side.

* * * * *